(12) United States Patent
Miyazaki et al.

(10) Patent No.: US 7,608,805 B2
(45) Date of Patent: Oct. 27, 2009

(54) CONTROL SYSTEM FOR BATTERY POWERED HEATING DEVICE

(75) Inventors: Mitsuhiko Miyazaki, Higashiosaka (JP); Toshinobu Ishihara, Hyogo Prefecture (JP); Hitoshi Takeuchi, Nara Prefecture (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 11/036,417

(22) Filed: Jan. 14, 2005

(65) Prior Publication Data

US 2006/0157466 A1    Jul. 20, 2006

(51) Int. Cl.
*H05B 1/02* (2006.01)

(52) U.S. Cl. .................. 219/497; 219/227; 219/229; 219/233; 219/236; 219/501

(58) Field of Classification Search ......... 219/221–242, 219/482–519; 228/51, 55
See application file for complete search history.

(56) References Cited

U.S. PATENT DOCUMENTS

| | | |
|---|---|---|
| 29,039 A | 7/1860 | Patee |
| 53,545 A | 3/1866 | Trowbridge |
| 62,941 A | 3/1867 | Crosby |
| 73,798 A | 1/1868 | Gleason |
| 154,077 A | 8/1874 | Perkins |
| 573,245 A | 12/1896 | Stutz et al. |
| 1,098,437 A | 6/1914 | Hadaway, Jr. |
| 1,350,181 A | 8/1920 | Remane |
| 1,667,618 A | 4/1928 | Abbott |
| 2,213,438 A | 9/1940 | Young |
| 2,390,498 A | 12/1945 | Capita |
| 2,582,481 A | 1/1952 | Dvorak et al. |
| 2,679,223 A | 5/1954 | Franklin |
| 2,689,901 A | 9/1954 | Obolensky |
| 2,751,484 A | 6/1956 | Moon |
| 2,908,796 A | 10/1959 | Reichelt et al. |
| 2,982,838 A | 5/1961 | Tyler |
| 3,037,274 A | 6/1962 | Hancock |
| 3,188,448 A | 6/1965 | Weller |
| 3,211,354 A | 10/1965 | Evers et al. |
| 3,245,599 A | 4/1966 | Johnson |
| 3,269,633 A | 8/1966 | Bemier et al. |
| 3,315,350 A | 4/1967 | Kent |
| 3,358,897 A | 12/1967 | Christensen |
| 3,429,024 A | 2/1969 | Postorino |
| 3,443,733 A | 5/1969 | Parente |
| 3,578,948 A | 5/1971 | Friend et al. |
| 3,584,190 A | 6/1971 | Marcoux |
| 3,627,191 A | 12/1971 | Hood, Jr. |
| 3,646,577 A | 2/1972 | Ernst |

(Continued)

FOREIGN PATENT DOCUMENTS

DE    2412143    9/1975

(Continued)

*Primary Examiner*—Stephen J Ralis
(74) *Attorney, Agent, or Firm*—Squire, Sanders & Dempsey, L.L.P.

(57) ABSTRACT

A control system and method of controlling a battery powered heating device such as a soldering or desoldering tool that includes a control circuit to control the delivery of power to a cartridge heating tip and to cycle the power to the cartridge heating tip during times of no use so as to minimize the amount of power expended to maintain the device in a ready or usable state.

19 Claims, 9 Drawing Sheets

U.S. PATENT DOCUMENTS

| | | |
|---|---|---|
| 3,715,797 A | 2/1973 | Jackson et al. |
| 3,804,320 A | 4/1974 | Vandermark |
| 3,818,539 A | 6/1974 | Fortune |
| 3,834,604 A | 9/1974 | Fendley et al. |
| 3,876,857 A | 4/1975 | Dhillon |
| 3,883,716 A | 5/1975 | Fortune |
| 3,884,409 A | 5/1975 | Kaufman |
| 3,919,524 A | 11/1975 | Fortune |
| 3,941,299 A | 3/1976 | Godfrey |
| 3,943,326 A | 3/1976 | Henry |
| 3,990,623 A | 11/1976 | Fortune |
| 4,023,724 A | 5/1977 | Wakita et al. |
| 4,034,202 A | 7/1977 | Vandermark |
| 4,055,744 A | 10/1977 | Fortune |
| 4,064,447 A | 12/1977 | Edgell et al. |
| 4,086,466 A | 4/1978 | Scharlack |
| 4,090,517 A | 5/1978 | Takenaka |
| 4,133,291 A | 1/1979 | Spirig |
| 4,137,369 A | 1/1979 | Chaikin |
| 4,164,606 A | 8/1979 | Spirig |
| 4,191,917 A | 3/1980 | Brown et al. |
| 4,206,864 A | 6/1980 | Rauchwerger |
| 4,416,408 A | 11/1983 | Sirig |
| 4,553,021 A | 11/1985 | Conti |
| 4,562,337 A | 12/1985 | Lawrence |
| 4,582,332 A | 12/1985 | Lawrence |
| 4,568,819 A | 2/1986 | Stacconi |
| 4,642,155 A * | 2/1987 | Ramsey ..................... 156/359 |
| 4,695,709 A * | 9/1987 | Sachs et al. ................. 219/494 |
| 4,698,774 A | 10/1987 | Abe et al. |
| 4,745,264 A | 5/1988 | Carter |
| 4,775,776 A | 10/1988 | Rahn et al. |
| 4,779,786 A | 10/1988 | Holdway |
| 4,779,790 A | 10/1988 | Wallgren et al. |
| 4,795,886 A | 1/1989 | Carter, Jr. |
| 4,830,260 A | 5/1989 | Kent |
| 4,839,501 A | 6/1989 | Cowell |
| 4,877,944 A | 10/1989 | Cowell et al. |
| 4,891,497 A | 1/1990 | Yoshimura |
| 4,903,884 A | 2/1990 | Royston et al. |
| 4,924,067 A | 5/1990 | Wilhelmson |
| 4,945,210 A | 7/1990 | Yoshimura |
| 4,997,121 A | 3/1991 | Yoshimura |
| 5,007,574 A | 4/1991 | Cariomago et al. |
| 5,014,210 A | 5/1991 | Postlewait et al. |
| 5,033,785 A | 7/1991 | Woolley, Jr. |
| 5,043,560 A | 8/1991 | Masreliez |
| 6,023,848 A | 8/1991 | Frey et al. |
| 5,059,769 A | 10/1991 | Fortune |
| 5,062,564 A | 11/1991 | Urban |
| 5,083,698 A | 1/1992 | Forsha |
| 5,094,139 A | 3/1992 | Forsha |
| 5,122,637 A | 6/1992 | Bottorff et al. |
| 5,151,574 A | 9/1992 | Urban |
| 5,170,024 A | 12/1992 | Hanatani et al. |
| 5,182,427 A | 1/1993 | McGaffigan |
| 5,297,717 A | 3/1994 | Parry |
| 5,305,941 A | 4/1994 | Kent et al. |
| 5,326,016 A | 7/1994 | Cohen et al. |
| 5,329,085 A | 7/1994 | Cowell et al. |
| 5,332,884 A * | 7/1994 | Bailey ........................ 219/494 |
| 5,395,046 A | 3/1995 | Knobbe et al. |
| 5,402,563 A | 4/1995 | Satoh et al. |
| 5,408,072 A | 4/1995 | Nagase |
| 5,412,178 A | 5/1995 | Tamura |
| 5,446,262 A | 8/1995 | McCambridge |
| 5,495,093 A | 2/1996 | Griffith |
| 5,553,767 A | 9/1996 | Weller |
| 5,570,004 A | 10/1996 | Shibata |
| 5,572,119 A | 11/1996 | Taylor |
| 5,579,533 A | 11/1996 | Weller |
| 5,683,603 A | 11/1997 | Fortune |
| 5,697,705 A * | 12/1997 | Callewaert ..................... 374/45 |
| 5,746,367 A | 5/1998 | Pai et al. |
| 5,770,835 A | 6/1998 | Sakuyama et al. |
| 5,796,072 A | 8/1998 | Okuno |
| 5,823,419 A | 10/1998 | Ichikawa |
| 5,901,898 A | 5/1999 | Stempke |
| 5,912,693 A * | 6/1999 | Katsuma et al. ............. 347/191 |
| 5,938,258 A | 8/1999 | Femling |
| 6,019,270 A | 2/2000 | Boll et al. |
| 6,040,560 A * | 3/2000 | Fleischhauer et al. ....... 219/494 |
| 6,054,678 A | 4/2000 | Miyazaki |
| 6,087,631 A | 7/2000 | Miyazaki |
| 6,186,387 B1 | 2/2001 | Lawrence et al. |
| 6,215,104 B1 | 4/2001 | Kurpiela et al. |
| 6,235,027 B1 | 5/2001 | Herzon |
| 6,237,831 B1 | 5/2001 | Lawrence et al. |
| 6,237,931 B1 | 5/2001 | Marola |
| 6,248,983 B1 | 6/2001 | Yamanoi |
| 6,329,641 B1 * | 12/2001 | Miyazaki et al. ............ 219/497 |
| 6,386,423 B1 | 5/2002 | Adler et al. |
| 6,563,087 B1 | 5/2003 | Yokoyama et al. |
| 6,580,050 B1 | 6/2003 | Miller et al. |
| 6,652,175 B2 | 11/2003 | Chang |
| 6,710,304 B2 | 3/2004 | Yokoo |
| 6,750,431 B2 | 6/2004 | Miyazaki |
| 6,766,817 B2 | 7/2004 | da Silva |
| 6,793,114 B2 | 9/2004 | Dunham et al. |
| 6,818,862 B2 | 11/2004 | Uetani et al. |
| 6,899,114 B2 | 5/2005 | Wilson |
| 2002/0117491 A1 | 8/2002 | Griffith |
| 2002/0158107 A1 | 10/2002 | Yokoo |
| 2003/0226837 A1 * | 12/2003 | Blake et al. ................. 219/260 |
| 2004/0016741 A1 | 1/2004 | Evanyk |
| 2004/0232132 A1 | 11/2004 | Masaki |
| 2006/0022018 A1 | 2/2006 | Yoshimura et al. |
| 2006/0186175 A1 | 8/2006 | Kay |

FOREIGN PATENT DOCUMENTS

| | | |
|---|---|---|
| DE | 10217336 | 12/2002 |
| EP | 0386948 | 9/1990 |
| EP | 0499734 | 2/1991 |
| EP | 0745919 | 12/1996 |
| EP | 1044751 | 10/2000 |
| GB | 1284994 | 8/1972 |
| GB | 2148676 | 5/1985 |
| JP | S48-67025 U | 8/1973 |
| JP | 54-161509 | 12/1979 |
| JP | 61001230 | 1/1986 |
| JP | 3001893 | 9/1994 |
| JP | 409057434 A | 3/1997 |
| JP | 11337468 A | 12/1999 |
| JP | 2000288723 | 1/2000 |
| JP | 2000317629 | 11/2000 |
| JP | 2001-71127 | 3/2001 |
| JP | 2001-245462 | 9/2001 |
| WO | WO 97/18504 | 5/1997 |
| WO | WO 97/26108 | 7/1997 |

* cited by examiner

CONTROL SYSTEM FOR BATTERY POWERED HEATING DEVICE

BACKGROUND OF THE INVENTION

1. Field of the Invention

The present invention is directed to the field of battery powered heating devices such as battery powered soldering irons. An exemplary version of such a device is disclosed in U.S. patent application Ser. No. 10/892,780, filed on Jul. 15, 2004, titled: "Soldering Device with Cartridge Type Battery Pack", hereby incorporated by reference. The present invention is more particularly directed to a control system to monitor and control the delivery of power to the heating device so as to provide the power necessary for utilization of the device yet reduce or minimize the battery drain and any unnecessary expenditure of power, and thereby maximize the battery life.

2. General Background and State of the Art

Soldering irons are used to make secure electrical connections by melting solder and allowing the solder to bond between two electrical devices such as wires and contact points of a circuit. A number of different types of soldering irons are in wide-spread use and have been available for a number of years. Desoldering devices are used to melt soldered connections and allow an electrical device to be removed and replaced.

Most soldering and desoldering devices are powered by electrical current, and particularly for industrial applications, the soldering devices use an AC power source. However, there are a few battery powered soldering devices that are available though their performance is somewhat limited. Examples are shown in U.S. Pat. Nos. 2,973,422; 3,141,087; 3,141,956; 4,064,447 and 5,446,262. In addition, to provide flexibility in a soldering device that has no electrical power connection requirement, there are soldering devices that utilize a gaseous fuel to heat a soldering tip through for example a catalyst or an open flame, as shown for example in U.S. Pat. Nos. 5,799,648 and 5,921,231.

While the devices according to the prior art may be able to provide cordless soldering capabilities, they do not provide control systems to minimize the amount of power utilization to extend the battery life. Accordingly, it would be desirable to provide a control system on a battery powered heating device which would minimize the unnecessary expenditure of battery power during periods when the device is turned on yet not being utilized.

The present invention is directed to a control system and method of controlling a battery powered heating device such as a soldering or desoldering tool that includes a control circuit to control the delivery of power to a cartridge heating tip and to cycle the power to the cartridge heating tip during times of no use so as to minimize the amount of power expended to maintain the device in a ready or usable state. The present invention provides an easy control system for a mobile temperature-controlled battery-powered heating device the performance of which is not influenced by battery voltage dissipation as the control system supplies suitable cycles of power depending on both the battery voltage and the steps of heating job loads.

DETAILED DESCRIPTION OF THE PREFERRED EMBODIMENT

Figure 1:
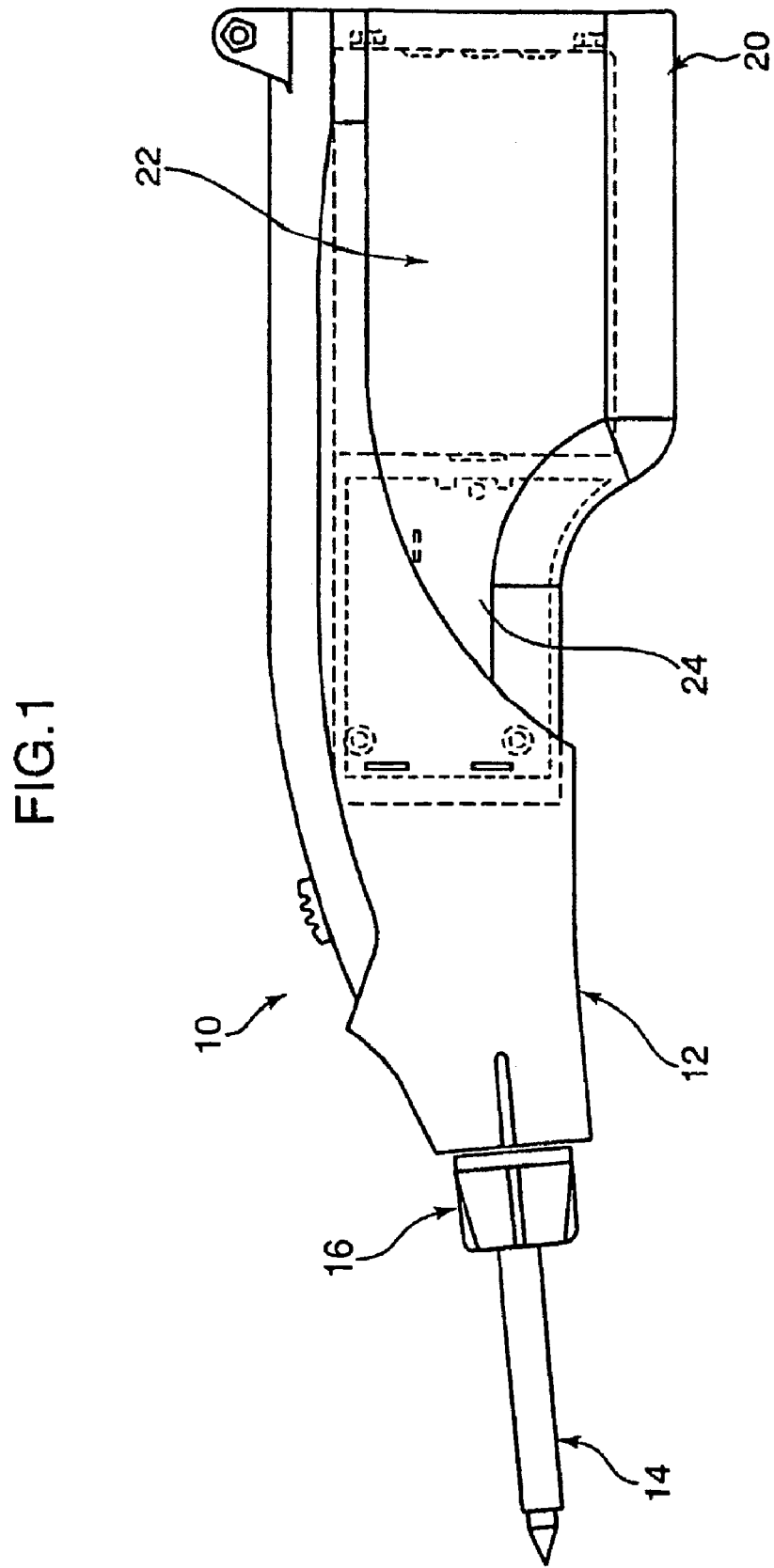
FIG. 1 is a side view of the soldering device of the present invention including the battery pack and circuit board.

FIG. 1 depicts a side view of a battery powered heating device 10 according to the present invention. The heating device 10 includes a handle 12 onto which a cartridge heating tip 14 is mounted and secured with a securing nut 16. The heating device preferably includes a removable battery pack and control system 20 which may be removed for charging or replacement of the battery or substitution of a charged battery pack. Structural details of an exemplary heating device in a soldering iron configuration are disclosed in the application Ser. No. 10/892,780 incorporated herein by reference. Briefly, the battery cartridge 20 includes a battery 22 and a circuit board 24. The circuit board 24 includes the primary components to connect to the battery, control the output of power and transmit power to the heating element of the cartridge heating tip 14. The cartridge heating tip 14 generally includes a coil resistance heating element to heat an iron tip.

Figure 2:
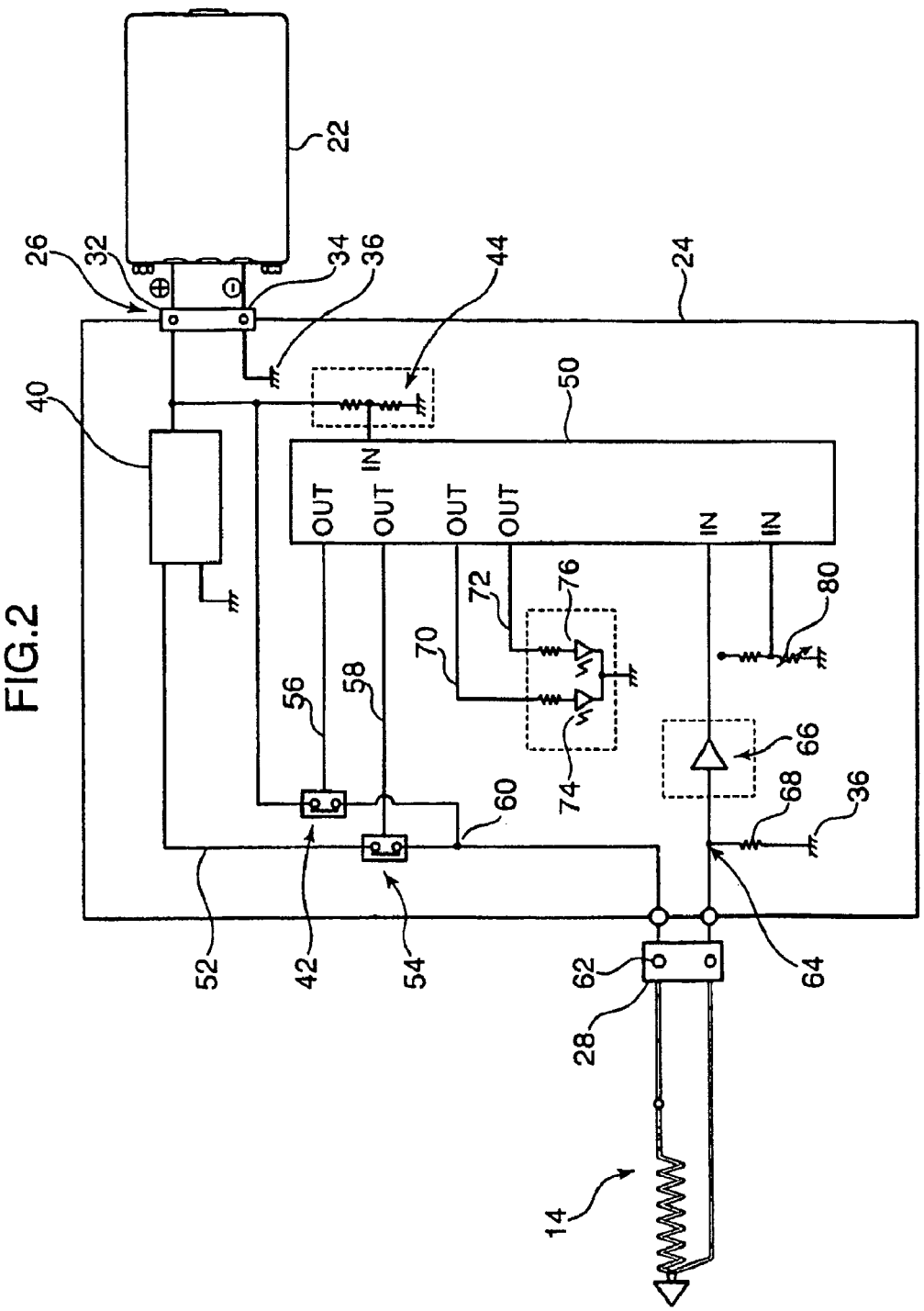
FIG. 2 is a wiring schematic of the electronics of the battery powered heating device of FIG. 1.

FIG. 2 depicts a schematic representation of the electrical control circuit within the heating device of FIG. 1. As depicted in FIG. 2, the battery 22 is interconnected to the circuit board 24 at a connector 26. The output of the circuit board 24 is connected to the heating cartridge 14 at connector 28. The electrical control circuit is principally configured to be mounted upon the circuit board 24 with the various components of the electrical control circuit attached thereto.

The connector 26 has a positive terminal 32 and a negative terminal 34 to be interconnected to the respective poles of the battery 22. The negative terminal 34 is connected to ground as shown at 36. The positive terminal 32 is connected to a junction that directs power to a constant voltage power supply circuit 40 and separately to a power field effect transistor ("power FET") 42. As common in the industry, these connections are all made via traces within the circuit board 24.

Power from the junction is also delivered to a battery voltage measuring circuit 44. The battery voltage measuring circuit 44 has an output to a microprocessor 50 mounted on the circuit board 24. The battery voltage measuring circuit 44 continuously monitors the battery voltage providing a voltage level signal to the microprocessor 50 which will turn off the system when the battery voltage drops below a predetermined level. In addition, the battery voltage at the start of a cycle is measured and reported to the microprocessor 50, as the voltage level of the battery impacts the calculation of the initial "on time" length to initially heat the cartridge heating tip 14 to an operating temperature, as will be discussed below.

The constant voltage power supply circuit 40 provides a constant output voltage, for example 3.3 volt DC output, on sensor power line 52 which is delivered to a sensor field effect transistor ("sensor FET") 54. Both the power FET 42 and the sensor FET 54 receive control signals from the microprocessor 50 on lines 56 and 58, respectfully. The output of the power FET 42 and the sensor FET 54 are merged at junction 60 and delivered, via the positive terminal 62 of the connector 28, to the cartridge heating tip 14.

Microprocessor 50 also has two outputs 70 and 72 which are directed to multi colored light emitting diodes ("LEDs") 74 and 76, respectively to provide a visual indication of the on status and ready status of the battery powered heating device 10.

Microprocessor 50 controls the cycling of the heating power and sensor power to the heating tip 14 by the respective activation of the power FET 42 and/or the sensor FET 54. Generally, the microprocessor 50 is programmed to control the delivery of power according to a fixed sequence that may be varied as the voltage level of the battery decreases and the desired tip temperature is selected. The sequencing is discussed in further detail below with respect to FIGS. 3 and 4.

The control circuit also includes a voltage amplifying circuit 66 which takes a signal off of the junction 64 connected to the negative post of the connector 28 and, through a resistor 68, to ground 36, to provide a sensed signal to the microprocessor 50. This sensed signal input to the microprocessor 50 allows the microprocessor 50 to calculate or estimate the temperature of the cartridge heating tip 14.

A variable resistor 80 may be included on the circuit board 24 to provide an input to the microprocessor 50. The variable resistor 80 may be used by the temperature control circuit to vary the output temperature of the heating device for different types of cartridges or soldering tips. Thus, certain types of tips may require less power to maintain a specified tip temperature and for these types of tips the variable resister can be used to decrease the power delivered to the tip by the control system.

Figures 3A, 3B, 3C:
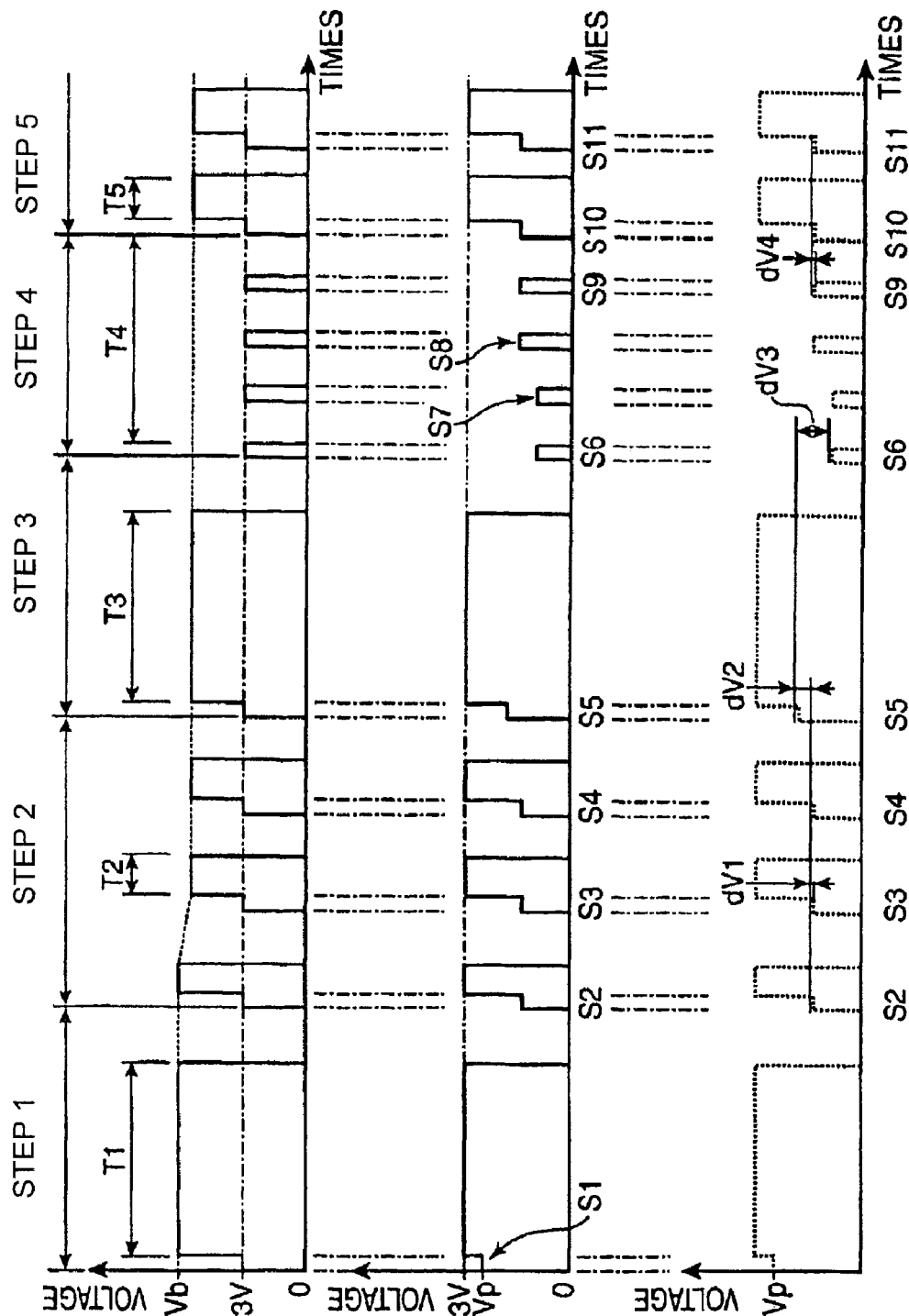
FIGS. 3A, 3B and 3C are charts depicting the various states of operation of the control system of the present invention.

FIG. 3A graphically depicts the various voltage wave forms at the junction 60 in the circuit of FIG. 2 for each of the respective STEP operations. FIG. 3B graphically depicts the voltage wave form at the junction 64 of the circuit of FIG. 2 for each of the respective STEP operations. This wave form is trimmed at the maximum limit of 3.3 volts. FIG. 3C graphically depicts the voltage change for controlling the heating power supply caused by the switching of the microprocessor 50 for each of the respective STEP operations. Each of the graphs of 3A, 3B and 3C have voltage values on the Y-axis and time on the X-axis. The time axis is further broken down into five "STEPs". Each STEP represents a time interval and a specific controlled operation for the heating device 10.

As discussed in more detail below, STEP 1 represents a time segment immediately following when the heating device 10 is turned on. STEP 2 is a time segment during which the heating device 10 is turned on, but not actively in use, and the temperature of the cartridge heating tip 14 is maintained at a determined level. STEP 3 is a time segment during which the heating device 10 is being used, for example to solder or de-solder a connection. STEP 4 is a time segment immediately after a use (as in STEP 4). STEP 5 is effectively a repeat of STEP 2, a time segment during which the heating device 10 is turned on, but not actively used and the tip temperature is adjusted then maintained at a determined level.

FIGS. 3A, 3B and 3C include the following nomenclature. For the voltage values on the Y-axis, "Vb" is the power supply voltage directly from battery 22 which may decrease as the battery is used. "Vn" is the voltage value at the junction 64 that is sensed by voltage amplifying circuit 66, and which is dependent on the resistance of the cartridge heater tip 14, a function of its temperature. Once "Vn" is determined, it is stored as "Vp", the voltage value at junction 64 just before a new value "Vn" is sensed, i.e., the immediately prior "Vn".

Preferably, the battery is a Lithium Ion battery, wherein "Vb" will change from approximately 7.2 volts at an ordinary full charged voltage to approximately 5.8 volts. The microprocessor 50 is programmed to shut off the heating power supply when the battery voltage drops lower than 5.8 volts. The voltage of the constant voltage power supply for sensing is set at 3.3 volts in this configuration, however, other voltage levels could be provided by the constant voltage power supply circuit 40.

On the X-axis, "T1" is the time length during which the heating power is supplied when the cartridge heating tip 14 is under a start-up condition just after a main power switch is turned on. T1 is determined by the microprocessor based upon the sensed value of Vb, the power supply voltage. "T2" is the time length during which the heating power is supplied when the cartridge heating tip 14 is in a "stand-by" condition after the initial start-up condition or after a loaded condition. The duration of T2 is also calculated by the microprocessor 50 based on the value of Vb. "T3" is the time length during which the heating power is supplied when the cartridge heating tip 14 is actually being used for soldering work, that is, the cartridge heating tip 14 is under a loaded condition. The value of T3 is set within the microprocessor to a duration in the range of approximately 5 to 10 seconds, a pre-determined time estimate of the average length of time that the device will be used to solder or desolder a connection. "T4" is the total interval during which no heating power is supplied when the cartridge heating tip 14 is cooling down after over-heating. "T5" is the time period during which heating power is supplied when the cartridge heating tip 14 is in a stand-by condition. T5 is thus similar to T2.

"S1" to "S11" are the sensing time, timing sequential numbers. During each sensing time, the constant 3.3 volts power is cycled to the cartridge heating tip 14. All sensing time lengths within all STEPS are set at a predetermined duration, for example, 25 milliseconds. However, other time lengths could be used, for example, any duration in the range of 20 to 50 milliseconds could be used.

The graph of FIG. 3C depicts the values of "dV", which is the difference between Vn and Vp for each sensed interval. dV is determined by the microprocessor 50 using the simple equation: $dV = Vn - Vp$.

Figure 4:
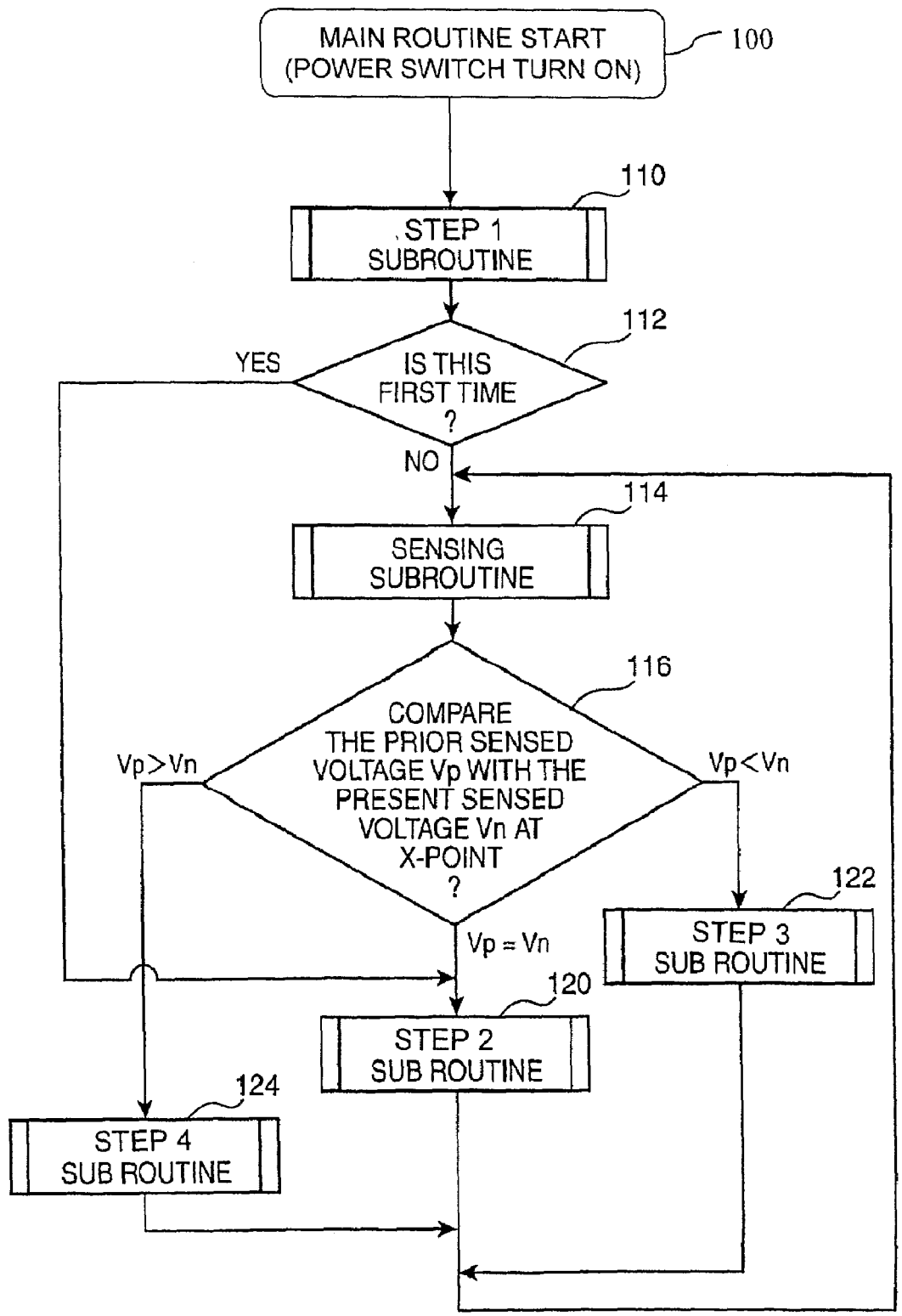
FIG. 4 is a flow chart of the basic operation and logic of the controller for the control system of the present invention.

FIG. 4 is a basic flow chart for the control algorithm used by the microprocessor 50 to control the temperature, and power usage, of the cartridge heating tip 14 by moving through the various STEPs. At box 100, the main power switch for the battery powered heating device 10 is turned "ON." This initiates STEP 1, the interval when the cartridge heating tip 14 is heated under the start-up full power supply to raise the temperature of the tip to a working level. As shown in FIGS. 3A and 3B, there is an initial period S1 during which sensor FET 54 is turned on and power FET 42 is turned off, so that 3.3 volts is delivered to the cartridge heating tip 14. This allows the control system to sense the temperature of the cartridge heating tip 14 and record a value Vn. After the interval S1, sensor FET 54 is turned off, power FET 42 is turned on and the full power from the battery is delivered to the tip 14 for the interval T1, a time length determined by the microprocessor 50.

During the initial part of STEP 1, the battery voltage measuring circuit 44 senses the battery voltage Vb. The time length T1 is determined based on the Vb value by the microprocessor 50. The sensed voltage value Vn during the initial sensing period S1 is not used for determination of the length of interval T1. In this starting step, just after the main switch is turned on, T1 has a duration sufficient to get the high tip temperature within the shortest time for quickly starting a job.

After the end of T1 there is an interval within STEP 1 during which both power FET 42 and sensor FET 54 are shut off, and no power is supplied to cartridge heating tip 14.

The control logic as shown in FIG. 4 then proceeds to decision point 112, at which it is determined whether the power has just been turned on (YES) or if the power has been on (NO). If the power has just been turned on (YES), after STEP 1 is completed, the controller proceeds to the STEP 2 subroutine.

If the determination at decision point 112 is "NO", then the control program proceeds to its sensing subroutine 114. In the sensing subroutine 114, at comparison point 116, the microprocessor receives a signal indicative of the present sensed voltage, Vn and compares that voltage value to the stored value Vp of the immediately previous sensing of Vn. If Vp=Vn, then the control program moves to the STEP 2 subroutine of box 120. If Vp<Vn, then the control program moves to the STEP 3 subroutine of box 122. If Vp>Vn, then the control program moves to STEP 4 subroutine of box 124. Upon the completion of the STEP 2, STEP 3 or STEP 4 subroutines, the control system returns to the beginning of the sensing subroutine 114, until, or unless, the power is turned off. In the comparison of the voltage Vn with Vp, which are the voltage values within the same device, the controller logic can neglect small differences among different devices. Further, these values of Vn and VB are size comparisons only, such as bigger, equal or smaller comparison, so they can be performed with the simple circuit.

Figure 5:
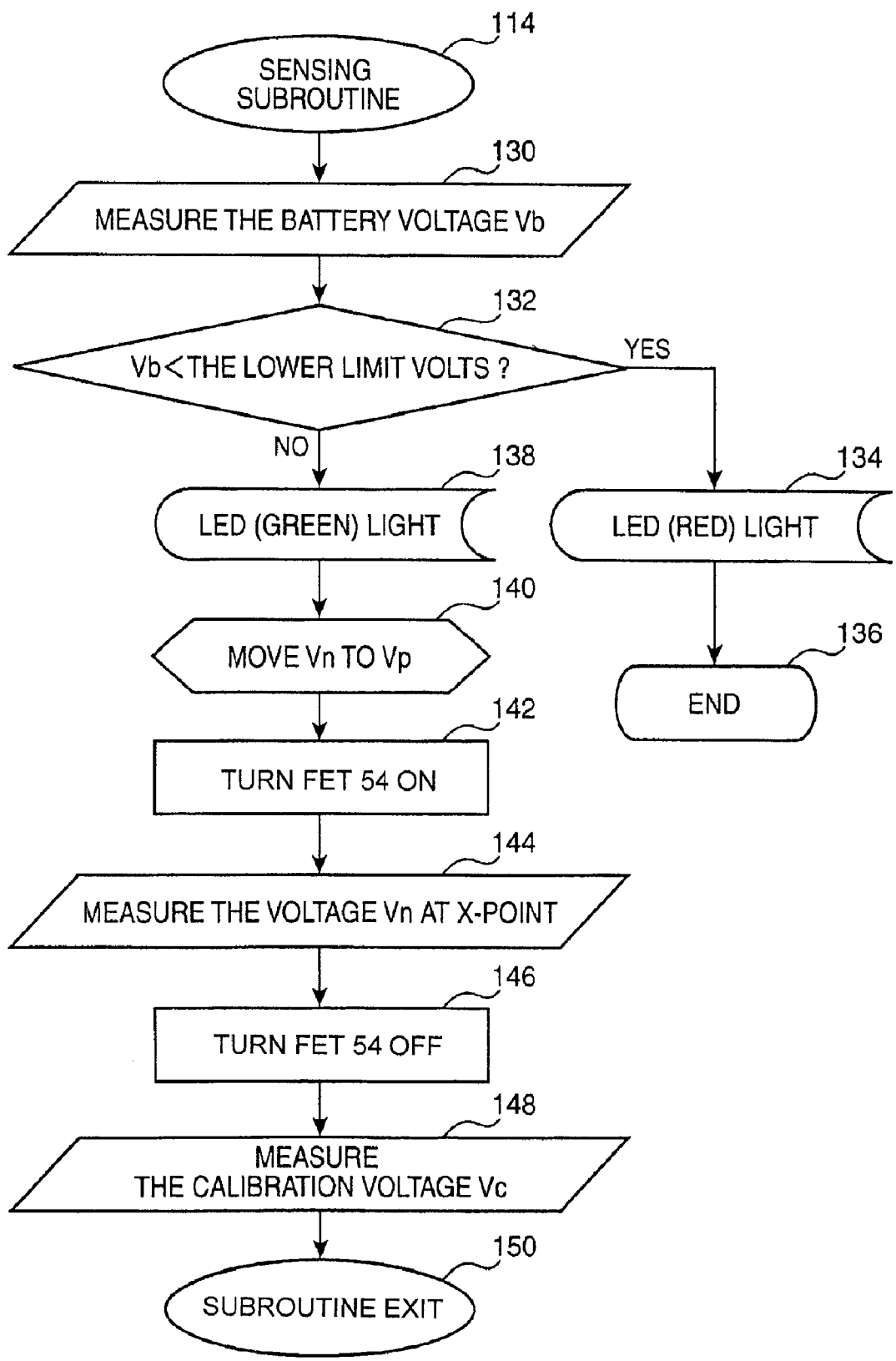
FIG. 5 is a flow chart of the sensing subroutine operation of the control system of the present invention.

FIG. 5 depicts the sensing subroutine 114 of the control system of the present invention. The sensing subroutine 114 starts with the measuring of the battery voltage Vb at box 130. After the battery voltage Vb is measured, at decision point 132 it is determined whether the voltage of the battery is greater than or less than the lower limit on the voltage. If the voltage for the battery Vb is lower than the lower limit, a YES decision, then the sensing subroutine 114 proceeds to light the red LED light at 134 and then end the subroutine at 136 by turning off the heating device 10. Thus, when the battery voltage Vb drops below a predetermined level the heating device cannot be operated and the battery must be either replaced or recharged.

However, when the decision at point 132 is that the battery voltage is greater than the lower limit on the voltage, then the sensing subroutine 114 proceeds to box 138 in which the LED green light is turned on and then the sense value of Vn is moved to a memory location and relabeled as Vp, for use as the immediately preceding sensed voltage at box 140. The sensing subroutine 114 then turns on sensor FET 54, as shown at box 142, to allow the measurement of the voltage Vn at box 144. After the Vn is measured, at box 146 the sensor FET 54 is turned off. The sensing subroutine then measures the calibration voltage Vc as shown at box 148 and thereafter exits the subroutine at box 150. Exiting the subroutine at box 150 causes the control system to proceed into the decision point 116 of FIG. 4, at which the control system decides which of the STEPs 2, 3 or 4 should be initiated.

Figure 6:
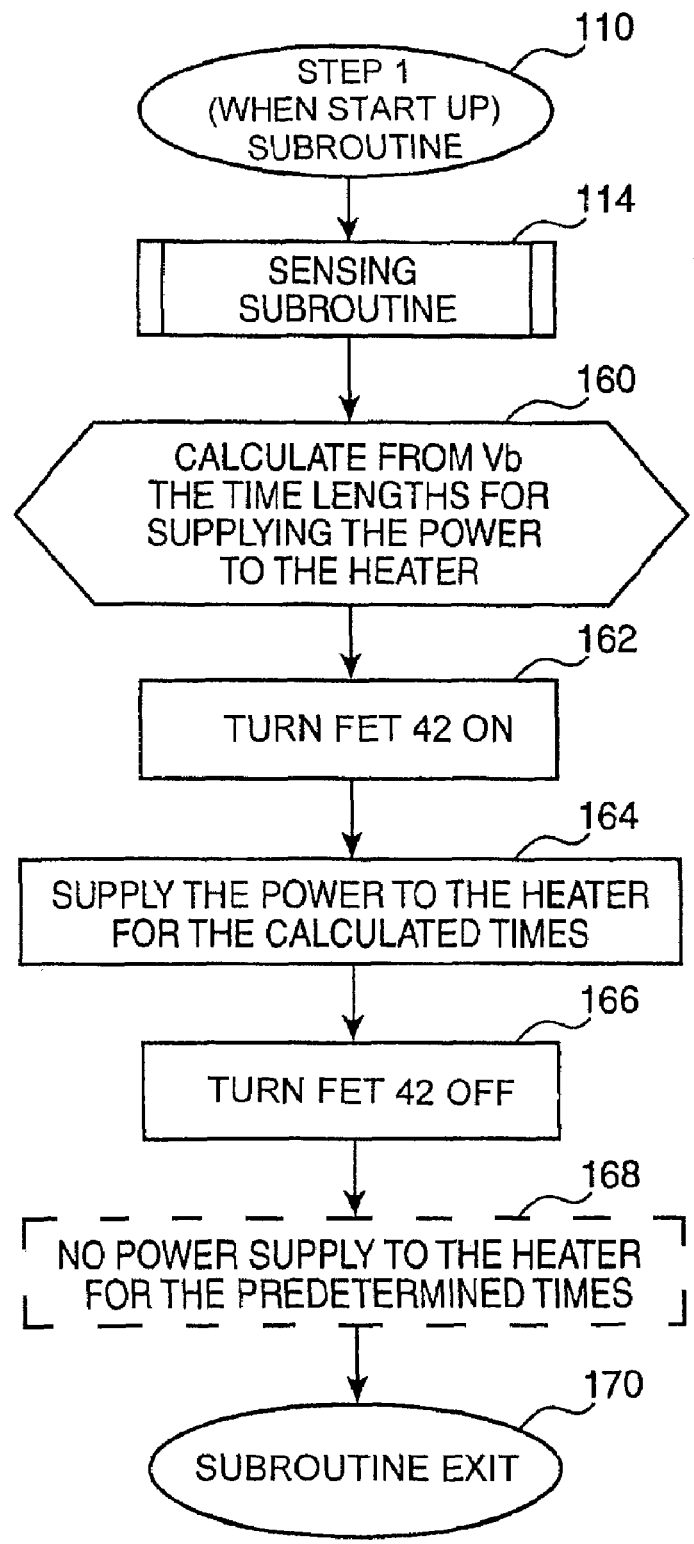
FIG. 6 is a flow chart of the STEP 1 subroutine for the control system of the present invention.
Figure 7:
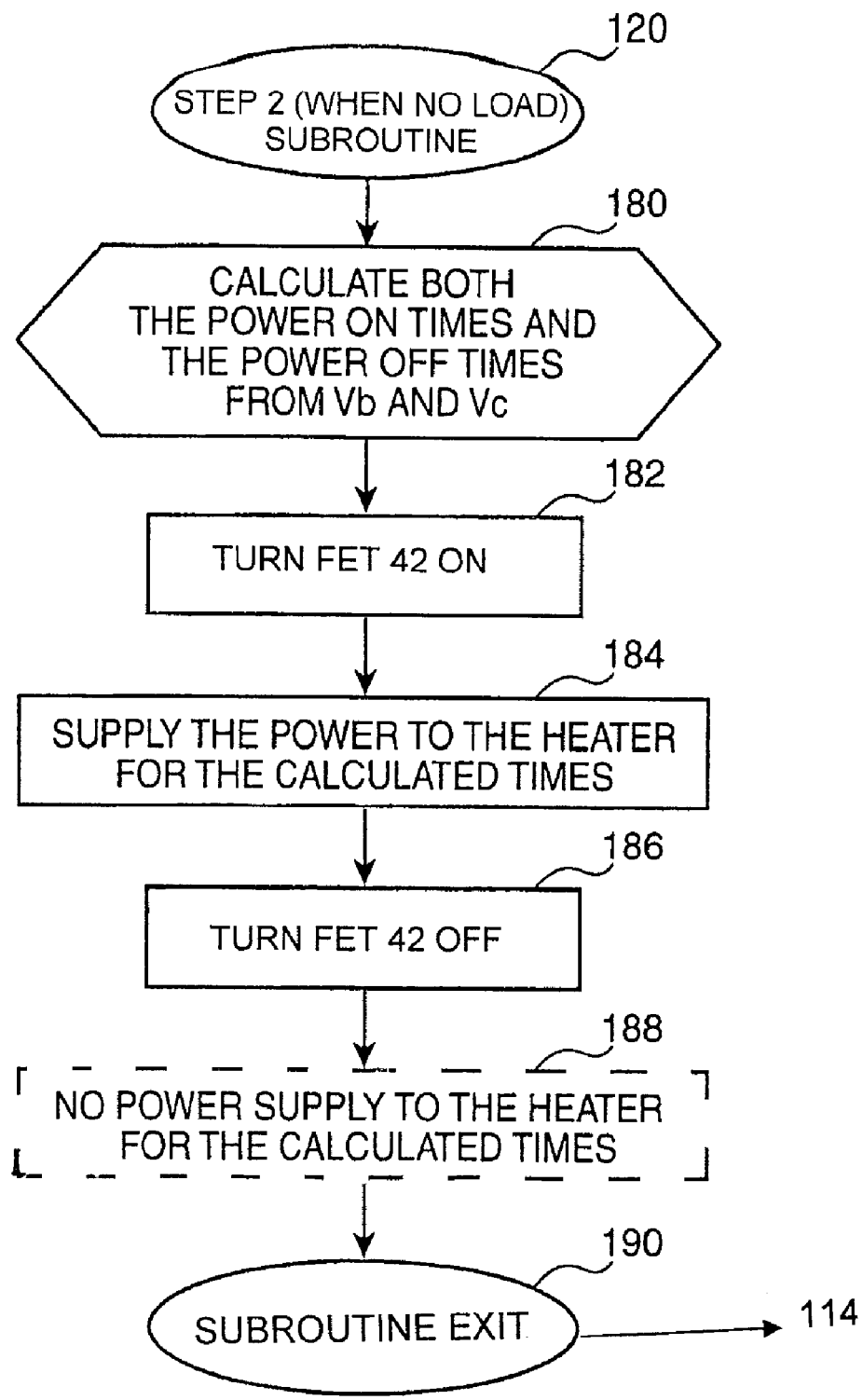
FIG. 7 is a flow chart the STEP 2 subroutine of the control system of the present invention.
Figure 8:
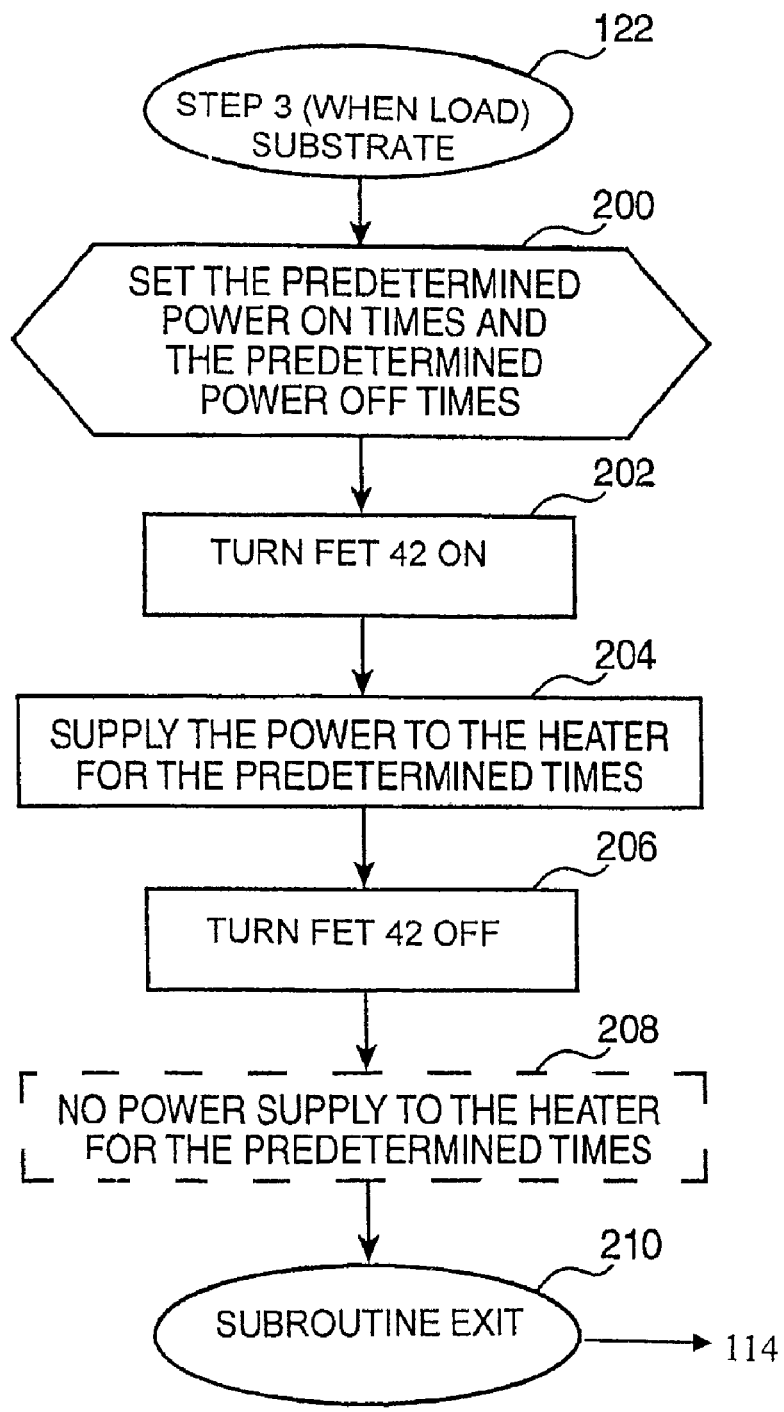
FIG. 8 is a flow chart of the STEP 3 subroutine of the control system of the present invention.
Figure 9:
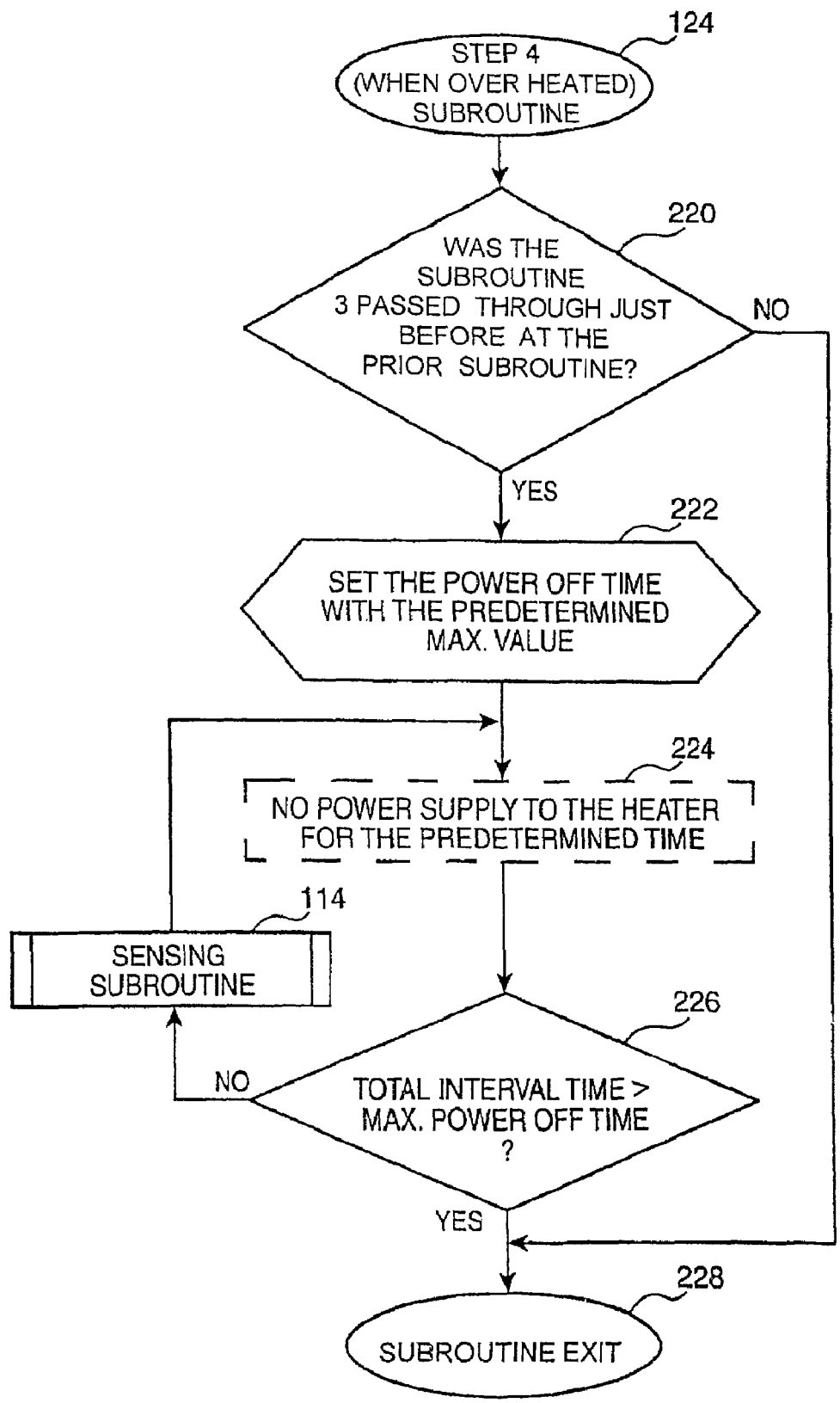
FIG. 9 is a flow chart of the STEP 4 subroutine of the control system of the present invention.

FIG. 6 depicts the STEP 1 subroutine control logic in block diagram form. The STEP 1 subroutine is shown at block 110 within FIG. 4, and thus starts at 110 at the top of FIG. 6. The STEP 1 subroutine starts by processing through the sensing subroutine as described above with respect to FIG. 5. At the end of the sensing subroutine, STEP 1 proceeds to box 160 in which there is a calculation of the time length T1 necessary for supplying power to the heater tip at the initiation of an initial "on" condition, as shown in box 160. Once the determination is made, the power FET 42 is turned on at box 162. At box 164, power is supplied to the heater tip for the time the STEP 3 subroutine has been completed just before the beginning of STEP 4, as shown at block 220. If it is determined that STEP 3 subroutine has just been completed, then the decision goes to box 222 at which the power off time for a predetermined maximum value is set. The process then proceeds to box 224, an interval where no power is supplied to the heater for a predetermined period of time. Once the predetermined time has expired in box 224, the system proceeds to box 226, in which the total interval time is determined to be greater than or equal to the maximum power off time. If the total interval time has not exceeded the maximum power off time, then the system goes to the sensing subroutine 114, from which it may revert back to a point at which the power supply to the heater is off for a predetermined time at box 224. If the total interval time is equal to or greater than the maximum power off time in box 226, then the system proceeds to the subroutine exit at box 228 and proceeds to the sensing subroutine at box 114 in FIG. 4. However, in STEP 4, if at box 220 it is determined that the STEP 3 subroutine has not proceeded as the immediately prior subroutine, then the system proceeds to the exit subroutine in block 228.

STEP 4 thus shows the process when the soldering cartridge heating tip 14 is not being used for soldering work just after a loaded condition (STEP 3) and the tip temperature is overheated. The power supply is shut off for several time intervals to lower the tip temperature. The total interval time T4 is approximately 5 seconds. This STEP 4 is controlled when dV=Vn−Vp<0, that is Vn<Vp, such as dV3 in FIG. 3C. One cycle of STEP 4 is comprised of 25 milliseconds of the sensing time followed by one second of interval time and repeating this cycle until 5 seconds of the interval time has expired. The sensed voltage value from sensing time S7 and S8 are not used for determination of the next STEP. The next STEP is determined by dV4 that is calculated from Vn after the 5 seconds of total interval time using Vp from just before the 5 seconds of total interval time of STEP 4.

As will be appreciated from a review of FIG. 4, the process illustrated in the graphs of FIGS. 3A, 3B and 3C do not necessarily proceed from STEP 1 through to STEP 4 sequentially. Instead, after the initial power on process of STEP 1, the sensing subroutine 114 decides which of the STEPs, STEP 2, STEP 3 or STEP 4, should be initiated.

The foregoing description is provided to describe the present invention to those skilled in the art but is not intended to limit the scope of the invention which is to be defined by the appropriate construction of the claims appended hereto.

What is claimed is:

1. A battery powered heating device comprising:
a battery;
a heating tip including a coil resistance heating element;
a first electrical line for delivering a voltage "Vb" from the battery to the heating tip, the first electrical line including a first switch, the heating tip receiving Vb when the first switch is closed;
a constant voltage circuit operatively coupled to the battery;
a second electrical line for delivering a voltage "V" from the constant voltage circuit to the heating tip, the second electrical line including a second switch, the heating tip receiving V when the second switch is closed;
a controller adapted to perform a plurality of subroutines that selectively open and close the first switch and selectively open and close the second switch, the controller further adapted to determine a present sensed voltage value "Vn" when the heating tip receives V, Vn dependent on resistance of the heating tip and representative of a temperature of the heating tip, the controller further adapted to compare a prior sensed voltage value "Vp" with Vn, and to select one of the plurality of subroutines in accordance with the comparison of Vp with Vn, wherein during at least one of the subroutines the controller calculates a time interval based on Vb and allows the heating tip to receive Vb during the calculated time interval, wherein V is less than Vb, and wherein V and Vb are greater than zero.

2. The device of claim 1, wherein the constant voltage circuit is adapted to maintain V at a constant voltage level.

3. The device of claim 1 wherein the controller is adapted to keep the first switch open while the second switch is closed to allow the heating tip to receive V.

4. The device of claim 1, wherein each one of the first switch and the second switch is a field effect transistor.

5. The device of claim 4, wherein the controller includes a microprocessor in communication with the field effect transistors.

6. The device of claim 1, further including a main power switch for the battery powered heating device, wherein when the main power switch has just been turned on the controller is adapted to allow the heating tip to receive a voltage waveform that brings the heating tip to a desired temperature level, the waveform having a magnitude equivalent to V during an initial sensing time period and a magnitude equivalent to Vb during a subsequent time period immediately following the initial sensing time period, the controller further adapted to calculate the subsequent time period based on Vb.

7. The device of claim 1, wherein the plurality of subroutines includes:
   a maintain temperature subroutine during which the controller is adapted to allow the heating tip to receive pulses of voltage at a level equivalent to Vb;
   a heater loaded subroutine during which the controller is adapted to allow the heating tip to receive voltage at a level equivalent to Vb during a predetermined time period; and
   a heater cool down subroutine during which the controller is adapted to allow the heating tip to only receive pulses of voltage at a level equivalent to V.

8. The device of claim 7, wherein during the maintain temperature subroutine the controller is adapted to allow the heating tip to receive a voltage level equivalent to V immediately before each pulse of voltage at the level equivalent to Vb.

9. The device of claim 1, wherein the plurality of subroutines includes a maintain temperature subroutine during which the controller is adapted to allow the heating tip to receive multiple pulses, each pulse having a magnitude equivalent to Vb and a duration equivalent to the calculated time interval, wherein the controller is adapted to select the maintain temperature subroutine when Vp is equal to Vn.

10. The device of claim 9, wherein during the maintain temperature subroutine, the controller is further adapted to allow the heating tip to receive a voltage equivalent to V immediately before each one of the pulses, and wherein the pulses are separated by a time interval in the range of about 600 milliseconds to about 700 milliseconds.

11. The device of claim 1, further comprising a variable resistor operatively coupled to the controller, the variable resistor adapted to allow an operator to vary a desired temperature of the heating tip.

12. The device of claim 1, wherein the plurality of subroutines includes a heater loaded subroutine during which the controller is adapted to allow the heating tip to receive Vb during a predetermined time duration, wherein the controller is adapted to select the heater loaded subroutine when Vp is less than Vn.

13. The device of claim 12, wherein the predetermined time duration is based on an estimate of time that the heating tip is expected to be used to solder or desolder a connection.

14. The device of claim 12, wherein the predetermined time duration is in the range of 5 seconds to 10 seconds.

15. The device of claim 1, wherein the plurality of subroutines includes a heater cool down subroutine during which the controller is adapted to allow the heating tip to only receive V during a predetermined time duration, wherein the controller is adapted to select the heater loaded subroutine when Vp is greater than Vn.

16. The device of claim 15, wherein the predetermined time duration is approximately 5 seconds.

17. The device of claim 1, wherein the plurality of subroutines includes:
   a maintain temperature subroutine during which the controller is adapted to calculate a first time duration based on Vb and to allow the heating tip to receive Vb during the first time duration in order to maintain the heating tip at a desired temperature level, wherein the controller is adapted to select the maintain temperature subroutine when Vp is equal to Vn; and
   a heater cool down subroutine during which the controller is adapted to allow the heating tip to only receive V over a predetermined second time duration, wherein the controller is adapted to select the heater loaded subroutine when Vp is greater than Vn and only after the heater loaded subroutine was just performed.

18. The device of claim 1, wherein the controller is adapted to allow the heating tip to receive a series of pulses, each pulse having a waveform with a magnitude equivalent to V during an initial sensing time period and a magnitude equivalent to Vb during a subsequent time period immediately following the initial sensing time period, the controller is further adapted to compare Vp with Vn within each pulse, and wherein the subsequent time period has a duration that depends upon the comparison of Vp with Vn.

19. The device of claim 18, wherein the pulses are separated from each other by a time interval, each pair of pulses from the series of pulses defining a sensed interval, and the time interval between a pair of the pulses is different from another pair of the pulses.

* * * * *